United States Patent [19]

Malson et al.

[11] 4,197,170

[45] Apr. 8, 1980

[54] RADIATION SOURCES AND PROCESS

[75] Inventors: Harold A. Malson, Kettering; Harold B. Honious; Stanley E. Moyer, both of Dayton; Edward F. Janzow, Xenia, all of Ohio

[73] Assignee: Monsanto Research Corporation, St. Louis, Mo.

[21] Appl. No.: 916,401

[22] Filed: Jun. 16, 1978

Related U.S. Application Data

[63] Continuation-in-part of Ser. No. 841,255, Oct. 11, 1977, abandoned.

[51] Int. Cl.[2] .......................... C25D 3/54; C09K 3/00

[52] U.S. Cl. ....................................... 204/1.5; 204/15; 204/29; 204/40; 204/43 T; 204/43 N; 204/43 G; 250/493; 250/499; 252/301.1 R

[58] Field of Search ...................... 204/1.5, 15, 29, 40, 204/43 G, 43 T, 43 N; 252/301.1 R; 250/493, 499

[56] References Cited

U.S. PATENT DOCUMENTS 3,859,179 1/1975 Staples .................................. 204/15

OTHER PUBLICATIONS

Strain et al., ORNL-3335, The Preparation and Properties and uses of $Am^{241}$, Alpha--, Gamma-, and neutron Sources, 1962, UC-4, pp. 12-15.

Verdingh et al., AERE-R-5097, UC-4-2, Proceedings of the Seminar on the Preparation and Standardization of Isotopic Targets and Foils, held at A.E.R.E., Harwell, Oct. 20-21, 1965, Smith M. L. ed., (Atomic Energy Research Establishment, Harwell, Eng.) Dec. 1965, pp. 58-62.

Valentin et al., Paper 15, AERE-R-5097, Proceedings of the Seminar on the Preparation and Standardization of Isotopic Targets and Foils, held at A. E. R. E., Harwell, Oct. 20-21, 1965, Smith, M. L. ed., Atomic Energy Research Estab., Harwell, Eng., Dec. 1965, pp. 86-87.

Bellemare et al.,Nuclear Instruments and Methods, 96, 1971, pp. 209-211.

Prakash et al., International Journal of Applied Radiation and Isotopes, 1971, vol. 22, pp. 128-129.

Foreman et al., Analytical Chimica Acta, 81, (1976), pp. 413-417.

*Primary Examiner*—Leland A. Sebastian

*Attorney, Agent, or Firm*—L. Bruce Stevens

[57] ABSTRACT

The invention relates to radiation sources comprising a substrate having an electrically-conductive non-radioactive metal surface, a layer of a metal radioactive isotope of the Scandium group, which in addition to scandium, yttrium, lanthanum and actinium, includes all the lanthanide and actinide series of elements, with the actinide series usually being preferred because of the nature of the radioactive isotopes therein, particularly americium-241, curium-244, plutonium-238, californium-252 and promethium-147, and a non-radioactive bonding metal codeposited on the surface by electroplating the isotope and bonding metal from an electrolytic solution, the isotope being present in the layer in minor amount as compared to the bonding metal, and with or without a non-radioactive protective metal coating covering the isotype and bonding metal on the surface, the coating being sufficiently thin to permit radiation to pass through the coating. The invention also relates to a process for providing radiation sources comprising codepositing a layer of the metal radioactive isotope with a non-radioactive bonding metal from an electrolytic solution in which the isotope is present in minor molar amount as compared to the bonding metal such that the codeposited layer contains a minor molar amount of the isotope compared to the bonding metal by electroplating on an electrically-conductive non-radioactive metal surface of a cathode substrate, and with or without depositing a non-radioactive protective metal coating over the isotope and bonding metal on the surface, the coating being sufficiently thin to permit radiation to pass through the coating.

41 Claims, No Drawings

RADIATION SOURCES AND PROCESS

CROSS-REFERENCE TO RELATED APPLICATION

This application is a continuation-in-part of copending application Ser. No. 841,255, filed Oct. 11, 1977, now abandoned.

BACKGROUND OF THE INVENTION

1. Field of the Invention

Radiation sources and an electroplating process for making radiation sources.

2. Description of the Prior Art

One commercial alpha-source, especially usable in smoke detectors, is made by Amersham Corporation of Arlington Heights, Ill. and is described as follows: An open silver case provides the substrate for the source. This silver case has a thin gold inner surface coating. In the silver case is placed a matrix which is a mixture of gold and americium-241 oxide powder which has been pressed into a solid billet. The billet is first sintered and then hot forged in the silver case with a gold-platinum alloy foil cover. Repeated rolling of this composite under controlled conditions produces a continuously welded metal strip of the desired dimensions with the active americium-241/gold matrix layer confined between inactive borders and protected by a thin gold alloy top layer. Another commercial alpha-source supplier is Nuclear Radiation Development, Inc., of Grand Island, N.Y. and their sources are made in a similar manner to the Amersham sources except that after the source is made Nuclear Radiation electroplates a thin gold top coating on the source.

SUMMARY OF THE INVENTION

The invention relates to radiation sources comprising a substrate having an electrically-conductive non-radioactive metal surface, a layer of a metal radioactive isotope of the scandium group which in addition to scandium, yttrium, lanthanum and actinium, includes all the lanthanide and actinide series of elements, with the actinide series usually being preferred because of the nature of the radioactive isotopes therein, particularly americium-241, curium-244, plutonium-238, californium-252 and promethium-147, and a non-radioactive bonding metal codeposited on the surface by electroplating the isotope and bonding metal from an electrolytic solution, the isotope being present in the layer in minor molar amount as compared to the bonding metal, and with or without a non-radioactive protective metal coating covering isotope and bonding metal on the surface, the coating being sufficiently thin to permit radiation to pass through the coating. The invention also relates to a process for providing radiation sources comprising codepositing a layer of the metal radioactive isotope with a non-radioactive bonding metal from an electrolytic solution in which the isotope is present in minor molar amount as compared to the bonding metal such that the codeposited layer contains a minor molar amount of the isotope compared to the bonding metal by electroplating on an electrically-conductive non-radioactive metal surface of a cathode substrate, and with or without depositing a non-radioactive protective metal coating over the isotope and bonding metal on the surface, the coating being sufficiently thin to permit radiation to pass through the coating.

DESCRIPTION OF THE PREFERRED EMBODIMENTS

An object of the invention is to provide radiation sources having improved properties over those of the prior art.

Another object of the invention is to provide a more economical and improved process for making the radiation sources.

Another object of the invention is to provide improved alpha-radiation sources.

Another object of the invention is to provide improved alpha-radiation smoke detector sources.

Another object of the invention is to provide an improved process for bonding the radioactive material of a radiation source to a substrate and improved radiation sources made by the process.

Another object of the invention is to provide an improved process for making many sealed radiation sources on a substrate such that each source remains sealed and there is no exposure of radioactive material when the sources are separated from one another, and improved radiation sources made by the process.

These and other objects of the invention will become apparent as the detailed description of the invention proceeds.

The radiation source may be an alpha, beta, gamma, neutron and/or other type radiation source; however, normally the process of the invention is more advantageous for producing alpha radiation sources or low energy gamma radiation sources.

Metal is defined for the purpose of this application including the claims as it is defined in Hackh's Chemical Dictionary, 4th Edition, as an electropositive chemical element characterized by ductility, malleability, luster, conductivity of heat and electricity, which can replace the hydrogen of an acid and forms bases with the hydroxyl radical. Radioactivity and/or non-radioactivity of metals is limited by the definition of radioactive isotopes of the scandium group as defined in the Sargent Periodic Table referred to hereinbelow.

The electrically conductive surface on the substrate can be provided by any non-radioactive metal which can also be the substrate, or any plastic, ceramic or other non-electrically conductive material can be used as the substrate and can be coated with a metal non-radioactive surface which will be capable of conducting electricity. Although flat substrates have been used and will normally be desirable, sources can be made on curved surfaces. Stainless steel, brass and nickel are especially suitable where the source may be subjected to high temperatures, such as caused by fires in the case of smoke detectors; however, stainless steel and nickel will normally withstand deterioration at appreciably higher temperatures then will brass. It may be desirable to put a thin (flash) coating of gold on the steel, brass or nickel which will serve especially well as the conductive surface. The flash coat can be with metals other than gold, with nickel and other noble metals being especially suitable alternatives. The flash coat can be applied by electroplating, plasma spraying, spluttering or other processes known in the art.

Any of the metal radioactive isotopes of the scandium group can be used in the process of the invention; however, especially useful are the metal radioactive isotopes of the actinide series, particularly americium-241 and curium-244 which are useful for making the alpha sources. Reference is made to the Periodic Table of the Elements, Copyrighted 1964 by E. H. Sargent and Company which table contains within it a table of radioactive isotopes, and this periodic table is incorporated by reference into the specification of this patent application; however, especially preferred radioactive isotopes of the actinide series, some of which are mentioned and some not in the Sargent Periodic Table, are the following: americium-241, curium-244, plutonium-238, californium-252 and promethium-147. Plutonium-238 can also be used in the process of the invention to make alpha sources.

The bonding metal can be any non-radioactive metal taken from Groups VB, VIB, VIIB, VIII, IB, IIB and IVB of the Periodic Table of the Elements above-mentioned, gold being especially preferred, however, silver, platinum, palladium, rhodium, iridium, of the precious metals can also be used, and in fact, any metal or mixture of metals listed in the above-mentioned Groups can be used depending on requirements of use. Normally it will be preferred to use a bonding metal sufficiently close in oxidation potential to the radioactive isotope being used in the process of the invention to obtain a suitable codeposition rate of radioactive isotope and bonding metal. Oxidation potentials for the various elements are discussed in details in the text "Oxidation Potentials," 2nd Ed., 1952, by Wendell M. Latimer, Prentice-Hall, Inc. It is preferred that the bonding metal be the major component by molar ratio in the codeposited layer of bonding metal and radioactive isotope to provide better bonding of this radioactive layer to the surface of the substrate, and sufficient radioactivity to satisfy the particular use will be provided when this radioactive layer contains a minor molar amount of radioactive isotope. However, normally the radioactive isotope will be reported in terms of radioactivity of the source rather than molar ratio since radioactivity for use purposes is the significant consideration.

The bonding metal and radioactive isotope are preferably dissolved in an electrolytic solution and an excess of bonding metal and radioactive isotope over and above that to be deposited is contained in the bath so the codeposition is carried out for a sufficient time and under suitable conditions to deposit a radioactive layer providing the desired radioactivity for the finished source with the electrolyte still containing substantial amounts of bonding metal and radioactive isotope when the codeposition is completed to make a source or a number of sources. Usually, when a large number of sources are desired, a large substrate will be masked with many holes in the mask for access to the conductive surface of the substrate and many substantially identical radioactive sources will be made simultaneously.

The electrolytic solution from which the coplating and plating of the invention is carried out are illustrated by the specific examples. Electroplating is discussed in some detail with references in the "Encyclopedia of Chemical Technology," by Kirk-Othmer, Interscience, 2nd Ed., Vol. 8, 1965, pages 36–74, and these teachings are incorporated herein by reference. Many different plating baths are discussed herein including gold, nickel and other plating baths.

In the text "Oxidation Potentials," by Wendell M. Latimer, 2nd Ed., 1952, Prentice-Hall, Inc., Appendix 1, pages 339–345, is a summary of oxidation-reduction potentials in acid solutions including gold, americium and many other elements. Oxidation-reduction potentials in basic solution are found in pages 345–348. The teachings of this text, "Oxidation Potentials" is incorporated herein by reference, especially pages 339–348, since it contains much information useful for choosing conditions for plating metals and for choosing bonding metals to coplate with radioisotopes.

After the radioactive isotopes and bonding metal spots are codeposited through holes in the mask, the mask is removed and a protective non-radioactive metal coating can be deposited over all the sources and substrate surrounding the spots. Deposition of the protective metal coating can be by electroplating, plasma spraying, spluttering and other known processes of the art. There are instances where the radioactive layer is located in a protective container for use, in which case it is not necessary to have a protective metal coating over the radioactive layer. The substrate with the completed sources thereon can then be cut to provide individual sealed sources, paired sealed sources, or as desired. For some uses it will be desirable to form radiation sources on both sides of a substrate and the sources may be of substantially equal or of different radioactivity levels depending on desired use. Sources can be made in any desired shape, round, square, rectangular, etc.

The following table contains examples of a number of suitable radioactive isotopes, bonding metals, substrates and metals for protective metal coatings to make alpha, gamma, neutron and beta sources of the invention by the process of the invention. These are intended to be merely illustrative and not limiting to the invention.

TABLE

| Isotopes | Coplate Metal | Substrate | Coating |
|---|---|---|---|
| | | Alpha Sources* | |
| Cm-244 | Ag, Pt | Stainless Steel | Au |
| Am-241 | Ir, Co | Brass | Ni |
| Pu-238 | Au | Au, Cd, | Cd |
| | | Ag, Pt, | Pt |
| | | Ni, Ir | Ir |
| | | Gamma Sources | |
| Am-241 | same as for alpha sources | same as for alpha sources | same as for alpha sources |
| Pu-238 | same as for alpha sources | same as for alpha sources | same as for alpha sources |
| | | Neutron Sources | |
| Cf-252 | Tb, Au, Ag | same as for alpha sources | same as for alpha sources |
| | | Beta Sources | |
| Pm-147 | Co, Rh, Ir, Ni, Pt, Au | same as for alpha sources | same as for alpha sources |

*Note:
For the alpha sources all of the coplate metals, all of the substrates and all of the coatings can be used with each isotope.

Original plating experiments were performed in a 10 ml beaker without stirring using a silver cathode of a 0.25 sq. in. and a gold anode of similar dimensions. Based on a goal of 2 μCi per 0.03 sq. in. (area of a smoke detector source) the desired output would be 63.66 μCi/sq. in. It was determined by varying the gold concentration in the solution as well as the Am-241 concentration it is possible to vary the plating rate from 28 μCi to 352 μCi per sq. in. in 30 minutes with a total plating thickness of 100 to 200 millionths of an inch. These samples before over plating show a narrow energy range of about 5.2 Mev. Overplating with a pure gold coating broadens the energy range and reduces the peak output to approximately 4.8 Mev with no evidence of total output loss. The advantage of this system is a tightly adhering americium-241 layer held in place by the gold. Purpose: manufacture of alpha and/or gamma emitting sources in the range of 1 to 50 $\mu$Ci/cm$^2$. A wide range of substrate materials are potential candidates for this system such as stainless steel, brass, nickel, platinum, etc.

Additional laboratory experiments have shown that americium-241 will codeposit with gold by electroplating. Control of the ratio of americium-241 (Am-241) to gold in the plating solution will vary the quantity of Am-241 deposited from <1 to at least 100 microcuries per square centimeter. Another variable which is dependent on the concentration ratio is the peak alpha particle energy. These variables, i.e., quantity of activity and peak alpha energy can be adjusted independently within limits. As an example, the maximum alpha energy from pure Am-241 is 5.45 million electron volts (Mev). During the experimental plating process energies have been measured as high as 5.42 Mev and as low as 4.5 Mev. There is no reason that lower energies are not possible, but at this time no practical reason has been found for developing this range. As the amount of activity increases the width of the energy curve skews towards the lower energy level, but maintains the peak energy.

The basic purpose of developing the above systems was for manufacture of Am-241 sources for use in smoke detectors. Currently the sources being marketed have an energy level of 4.8 Mev. Since the smoke detector device uses the available energy for ionization of an air gap, a higher energy would produce more ionized air particles per unit of Am-241. Using a test fixture supplied by General Electric we have evaluated the ionization per unit of activity by applying voltage across an air gap and measuring the current. Experimental data indicate the higher energy sources, i.e., ~5.3 Mev allow approximately twice the current flow/unit of activity of a commercial source which has an energy level of 4.8 Mev. The high energy sources (5.3 Mev) reached a current plateau at 38.2 $\mu$Ci per sq. in. The lower energy commercial sources (4.8 Mev) were not available in a wide range of microcuries to determine the slope of the current nor its plateau when plotting current (constant voltage across a constant air gap) vs. microcuries.

By controlled plating techniques, this system also allows the manufacture of a totally sealed source. Current commercial sources are punched from a layered assembly which leaves an open edge of Am-241 exposed. With the electroplating system, an area of Am-241 and gold may be deposited and then an over deposit of gold applied which extends beyond the perimeter of the active area.

The desired effects have been most reproducible in the range of 0.4 and 0.5 gram gold per liter. The concentrations of Am-241 used to date have ranged from 5 $\mu$Ci/liter to 11.5 $\mu$Ci per liter with good results. The pH of the plating solution was varied from 4 to 8 with an initial pH in the range of 5.5 to 7.0 being most effective. Deposit thickness is estimated to be less than 10 millionths of an inch.

Advantages of the electro coplating system of Am-241 and gold are:

1. Provides electrodeposition of Am-241 at higher levels of activity than previously possible.
2. Provides a method of controlling the alpha particle energy to a desired level.
3. Provides a means to manufacture a totally sealed alpha source of a small size using Am-241.
4. Allows flexible source design.

EXAMPLE 1

This example describes a typical plating bath and plating conditions for the codeposition of americium-241 and gold in the process of the invention for making smoke detector size sources of the invention.

PLATING BATH

~0.005 molar of potassium gold cyanide
1.5 $\mu$Ci*/cc of americium-241 nitrate ($1.39\times10^{-9}$ molar) made by dissolving americium-241 oxide in sufficient concentrated (~14 normal) nitric acid to dissolve the oxide.
~800 cc of aqueous solution in bath
pH adjusted to 6.0 to 6.5 by using sodium borate buffer

PLATING CONDITIONS

Voltage is ≃4.5 volts
Plating current is 0.65 ma (0.02 ma/cm$^2$**)
Time of deposition is ~10 minutes
Deposition is 3.0 to 4.08 $\mu$Ci/cm$^2$ ($8.7\times10^{-5}$ to $1.19\times10^{-4}$ g/cm$^2$)
Gold deposition was not quantitatively measured, but is estimated to be ~0.04 g/cm$^2$**
Anode is a nickel foil of dimensions 6″×3″
Cathode is a brass plate (70% Cu+30% Zn) of dimensions 6″×3″
~90 circular spot disc areas on one side of cathode, each spot having a diameter of ~0.2 in.

The electrodes, anode(s) and cathode(s) are positioned parallel and close (about 1-2″) to one another and in a perpendicular position in the bath.

EXAMPLE 2

This example describes another suitable plating bath and plating conditions for the codeposition of americium-241 and gold in the process of the invention to make smoke detector size sources of the invention.

PLATING BATH

~0.005 molar of potassium gold cyanide
1.5 $\mu$Ci*/cc of americium-241 nitrate ($1.39\times10^{-9}$ molar) made by dissolving americium-241 oxide in sufficient concentrated nitric acid to dissolve the oxide.
2.8 liters of aqueous solution in bath
pH held between 6.0 and 6.5 by additions of gold cyanide, americium-241 nitrate and citric acid solutions.

PLATING CONDITIONS

Voltage is ≃7 volts
Plating current is ~200 ma (2.5 ma/cm$^2$**)
Time of deposition is ~3 minutes.
Deposition is 2.5 to 5 $\mu$Ci*/cm$^2$ ($7.25\times10^{-5}$ to $1.45\times10^{-4}$ g/cm$^2$)
Gold deposition was measured in a rather crude way and estimated to be 0.09 g/cm$^2$**
Anode is a stainless steel grid (i.e. perforated) plate of dimensions 6″×11⅝″
Cathode is a brass plate (70% Cu and 30% Zn) of dimensions 6″×11⅝″
~250 circular spot disc areas on one side of cathode, each spot having a diameter of ~0.2 inch.

The electrodes (anode(s) and cathode(s)) are vertically positioned and paralleled closely (about ½″ to each other).

*A μCi is one millionth of a curie.
**This is based on the total spot area being plated.

PROCEDURE

By conventional silk screen printing process the brass cathode is coated with a nonconductive resist ink leaving the ~90 (Ex. 1), and ~250 (Ex. 2) or more circular spots of uncoated brass for preparing smoke detector sources. The particular nonconductive resist ink used in the examples is manufactured and sold commercially by Colonial Printing Ink Co., 180 East Union Ave., East Rutherford, N.J. 07073, and this particular ink is described by Colonial as follows: ER-6028 R.U. Blue, ready to use, prints excellent fine line and strips easily. Each spot of uncoated brass is ~0.2" in diameter. First, a very thin coating of gold is electroplated over the brass spots. Alternatively, the brass substrate can be gold plated before the masking via the silk screen process. Then the americium-241 and gold are codeposited by electroplating on the spots. The cathode is then immersed in methylene chloride and the ink is scrubbed from the cathode using a fabric covered brush. Lastly, a thin coating of gold is electroplated over the americium-241 gold layer and the brass area surrounding the spots thereby providing sealed sources which can be separated by cutting the plated cathode to give single spot sources, paired sources or as desired with no exposure of radioactive material. A typical single radiation source for smoke detector use has an alpha-radiation output of approximately 0.5 microcuries.

For the smoke detector sources before the thin gold protective coating is plated over the radioactive americium-241/gold layer, the energy level of the alpha particles being emitted is ~5.4 Mev which is almost equal to americium-241 (~5.45) plated in the absence of codeposited gold. For the smoke detector sources the thickness of the gold protective coating layer can be plated to any desired thickness to reduce the alpha energy level from the source to any desired level below 5.4 Mev, normally in the range of 4.5 to 5.0 Mev.

EXAMPLE 3

This example describes suitable plating baths and plating conditions for the codeposition of Am-241 and gold in the process of the invention to make smoke detector size sources of the invention wherein nickel is the substrate. Gold is used effectively to seal the isotope in predetermined areas on the plate and also the source performs well in mechanical and chemical tests. Sources can be fabricated on one side of the plate or on both sides of the plate as desired.

In making the sources of this example the nickel substrate is first flash electroplated with gold over the entire surface of both sides. If sources are to be made on only one side of the substrate, the one side is masked over the entire surface while the other side is masked except in the 512 spot areas on which sources are to be formed. If sources are to be made on both sides of the substrate, both sides are masked except in the 512 spot areas on each side on which sources are to be formed. The three edges of each substrate cathode that are submerged in plating solution are masked by hand coating the resist ink to prevent electroplating on these edges. Next gold is electroplated over each spot area. Then the coplate of gold and americium-241 is electroplated on each spot. Then gold is electroplated over each spot coplate area. The masking is then removed and a final cover of gold is electroplated over both sides including both spot and nonspot areas. All this is explained in the detailed discussion of this example which follows:

PLATING BATHS

A. Gold flash or gold overplate bath
- ~0.003 molar potassium gold cyanide
- ~0.005 molar sodium tetraborate
- ~18.9 liters of distilled water
- ~9 pH which is held reasonably constant by sodium tetraborate buffering
- ~room temperature B. Americium-241 and gold bath
- ~1.5 μCi/cc of americium-241 nitrate ($1.38\times10^{-9}$ molar) made by dissolving americium-241 oxide in excess of concentrated nitric acid sufficient to dissolve the oxide
- ~0.010 molar citric acid
- ~18.9 liters of distilled water
- ~6.5 pH varies, but is adjusted by adding potassium gold cyanide and americium-241 nitric acidic solutions while holding the citric acid concentration approximately constant.
- ~room temperature

PLATING CONDITIONS AND SEQUENCE OF PLATING CONDITIONS FOR MAKING EXAMPLE 3 SOURCES

1. Gold flash as a simultaneous preflash on 3 nickel 200 substrates (Bath A)
   Anodes (4) a stainless steel 304 wire woven grid plate of dimensions 8"×12"
   Cathodes (3) is nickel 200 plate of dimensions 8"×12"×0.021"
   Nickel 200 is approximately 99.64% Ni, 0.01% Cu, 0.04% Si, 0.003% S, 0.01% Fe, 0.18% Mn, 0.07% C
   Bare nickel 200 metal on both sides of plate
   ~4.5 volts
   ~3.0 amps
   ~8.0 minutes plating time
2. Gold flash as a simultaneous gold flash on three nickel 200 plates in unmasked dot area only (Bath A)
   Anode same as 1
   Cathode same as 1 except mask on metal surface, but not covering the 512 dot areas on a side of the plate,
   the metal surface in the spot area is the gold preflash from part 1
   a. spot areas on both sides of the plate (512 spots on each side)
      ~3.2 volts
      ~1.5 amps
      ~3.0 minute plating time
   b. spot area on one side of the plate (512 spots)
      ~3.0 volts
      ~0.75 amps
      ~3.0 minute plating time

AMERICIUM-241 AND GOLD SIMULTANEOUSLY CODEPOSITED ON THREE NICKEL 200 SUBSTRATES IN SPOT AREAS ONLY (BATH B)

Anode is a gold flashed s.s. 304 perforated plate of dimensions 8"×12"
Cathode is from 2 above
Deposition is 2.5 to 5 μCi/cm²

1. Spot areas on both sides of the plate (512 spots on each side)

~4.5 volts
~1.0 amps
~5.0 minute plating time

2. Spot areas on one side of the plate (512 spots)
~3.6 volts
~0.5 amps
~5.0 minute plating time

GOLD OVERPLATE IN SPOT AREA ONLY (BATH A)

Anode is same as codeposited statement cathode from codeposited portion of plating procedure.

1. Spots on one side of the plate.
~2.6 volts
~0.5 amps
~15.0 minutes plating time
2. Spots on both sides of the plate.
~3.2 volts
~1.0 amps
~15.0 minute plating time GOLD OVERPLATE OVER ENTIRE SURFACE OF DEMASKED PLATE FOR BOTH SIDES OF PLATE (BATH A)

~2.9 volts
~1.5 amps
~45 minutes plating time

The electrodes (anode(s) and cathode(s)) are vertically positioned and parallel to each other with spacing between an anode and a cathode being about 1.8".

PROCEDURE

First, the nickel 200 substrate is gold flash coated before the masking via the silk screen process. By conventional silk screen printing process the gold-coated nickel 200 cathode is coated with the nonconductive resist ink leaving the ~512 circular spots of gold-coated nickel 200 for preparing smoke detector sources. Each spot of unmasked gold-coated nickel 200 is ~0.2" in diameter. In addition, after masking, a very thin coating of gold is electroplated over the gold-coated nickel 200 spots. Then the americium-241 and gold are codeposited by electroplating on the spots. The codeposited source spots are gold overplated before mask removal to maintain source content integrity. The cathode is placed in a spray rinse tank of methylene chloride and the ink is automatically sprayed and hand wriped off the cathode using a soft paper towel. Lastly a thin coating of gold is electroplated over the entire surface area of the source plate thereby providing sealed sources which can be separated by cutting the plated cathode to give single spot sources, paired sources or as desired with no exposure of radioactive material. A typical single radiation source for smoke detector use has an alpha-radiation output of approximately 0.5 microcuries.

EXAMPLE 4

This example describes suitable plating baths and plating conditions for the codeposition of Am-241 and gold in the process of the invention to make smoke detector size sources of the invention wherein nickel is the substrate. Gold is used to effectively seal the isotope in predetermined areas on the plate. A nickel outer coating is used so the integrity of the gold coating is maintained in a high temperature fire test as well as in mechanical tests. Sources can be fabricated on one side of the plate or on both sides of the plate as desired.

In making the sources of this example the same steps are followed as in Example 3, plus a further step wherein a nickel coat is electroplated over the final gold coat on both sides of the plates of Example 3.

PLATING BATH TYPES AND APPROXIMATE COMPOSITIONS

Bath A is same as Example 3.
Bath B is same as Example 3.
Bath C—Nickel Sulfate Overplate
~0.050 molar nickel sulfate
~0.040 molar potassium citrate
~18.9 liters of distilled water
~6.5 pH varies slightly, but is maintained fairly constant by the potassium citrate buffering
room temperature
Bath D—Nickel Chloride Overplate
~0.105 molar nickel chloride
~0.020 molar potassium citrate
~18.9 liters of distilled water
~6.8 pH varies, but is maintained fairly constant by the potassium citrate buffering
room temperature

PLATING CONDITIONS FOR A GIVEN NICKEL BATH

Anode is the same and cathode is the same as in Example 3 with a gold overplate.

1. Nickel sulphate (plating on both sides of one cathode)
~2.2 volts
~0.30 amps
~10 minute plating time
room temperature
2. Nickel chloride (both sides of three cathodes)
~2.0 volts
~4.2 amps
~15 minutes
room temperature The electrodes (anode(s) and cathode(s)) are vertically positioned and paralleled closely (about ½" to each other).

PROCEDURE

First, the nickel 200 substrate is gold flash coated before the masking via the silk screen process. By conventional silk screen printing process the gold-coated nickel 200 cathode is coated with the nonconductive resist ink leaving the ~512 circular spots of gold-coated nickel 200 for preparing smoke detector sources. Each spot of unmasked gold-coated nickel 200 is ~0.2" in diameter. In addition, after masking, a very thin coating of gold is electroplated over the gold-coated nickel 200 spots. Then the americium-241 and gold are codeposited by electroplating on the spots. The codeposited source spots are gold overplated before mask removal to maintain source content integrity. The cathode is placed in a spray rinse tank of methylene chloride and the ink is automatically sprayed and hand wiped off the cathode using a soft paper towel. A thin coating of gold is electroplated over the entire surface area of the source plate thereby providing sealed sources. Lastly a thin coating of nickel using either baths C or D is electroplated over the entire gold overplated surface to maintain the gold integrity during a high temperature fire test as well as mechanical testing. A typical single radiation source for smoke detector use has an alpha-radiation output of approximately 0.5 microcuries.

EXAMPLE 5

This example describes suitable plating baths and plating conditions for the codeposition of Am-241 and gold in the process of the invention to make smoke detector size sources of the invention wherein nickel is the substrate.

Gold is used to effectively seal the isotope in predetermined spot areas on the next plate. A nickel coating is placed over the gold coating and the outer coating is gold over the nickel coating. This is done so that the source will perform well in the mechanical, high temperature fire and chemical tests. Sources can be fabricated on one side of a plate or on both sides of a plate depending on what is desired.

In making the sources of this example the same steps are followed as in Example 4, plus a further step wherein a gold coat is electroplated over the final nickel coat on both sides of Example 4.

PLATING BATH TYPES AND APPROXIMATE COMPOSITIONS

Baths A, B, C and D are the same as in Example 4. Plating conditions for gold are the same as in Example 4. Plating conditions for nickel are the same as in Example 4.

The electrodes (anode(s) and cathode(s)) are vertically positioned and paralleled closely (about ½" to each other).

PROCEDURE

First, the nickel 200 substrate is gold flash coated before the masking via the silk screen process. By conventional silk screen printing process the gold-coated nickel 200 cathode is coated with the nonconductive resist ink leaving the ~512 circular spots of gold-coated nickel 200 for preparing smoke detector sources. Each spot of unmasked gold-coated nickel 200 is ~0.2" in diameter. In addition, after masking, a very thin coating of gold is electroplated over the gold-coated nickel 200 spots. Then the americium-241 and gold are codeposited by electroplating on the spots. The codeposited source spots are gold overplated before mask removal to maintain source content integrity. The cathode is placed in a spray rinse tank of methylene chloride and the ink is automatically sprayed and hand wiped off the cathode using a soft paper tower. In addition a thin coating of nickel using either baths C or D is electroplated over the entire gold overplate to maintain the gold covering integrity during a high temperature fire test. Lastly a thin coating of gold is electroplated over the nickel coating so the nickel integrity is maintained during a chemical corrosion test. A typical single radiation source for smoke detector use has an alpha-radiation output of approximately 0.5 microcuries.

There are indications from the literature and from discussions with some persons skilled in the art that at least some metal radioactive isotopes such as americium-241, plutonium-238 and the like may not electrocoplate out as metals per se but rather as oxides, hydroxides, salts or complexes, or if they do plate out as metals they may be almost instantaneously converted to oxides, hydroxides, salts or complexes on the substrates on which they are deposited. Thus the americium-241 or plutonium-238 coplated with gold or other bonding metal may be present in the coplated layer an an oxide, hydroxide, salt or complex.

Although the invention has been described in terms of specific embodiments which are set forth in considerable detail, it should be understood that this is by way of illustration only and that the invention is not necessarily limited thereto since alternative embodiments and operating techniques will become apparent to those skilled in the art in view of the disclosure. For example, it is within the skill of the art having the teachings of the subject application, to prepare electrolytic solutions, i.e. electrolyte baths, having radioactive isotopes other than americium-241 and bonding metals other than gold dissolved therein, adjust pH, etc., and these baths will be usable in the process of this invention to prepare other radiation sources of the invention. Accordingly, modifications are contemplated which can be made without departing from the spirit of the described invention.

What is claimed is:

1. A radiation source comprising a substrate having an electrically-conductive non-radioactive metal surface and a layer of a metal radioactive isotope of the scandium group and a non-radioactive bonding metal selected from Groups VB, VIB, VIIB, VIII, IB, IIB and IVB of the Periodic Table of Elements codeposited on said surface by electroplating said isotope and bonding metal from an electrolytic solution, said isotope being present in said layer in minor molar amount as compared to said bonding metal.

2. A radiation source of claim 1 wherein a non-radioactive protective metal coating covers said isotope and bonding metal on said surface, said coating being sufficiently thin to permit radiation to pass through said coating.

3. A radiation source of claim 2 comprising an alpha-radiation source having anlpha-emitter radioactive isotope.

4. An alpha-radiation source of claim 3 wherein said alpha-emitter is selected from the group consisting americium-241, curium-244 and plutonium-238, said bonding metal is selected from the group consisting of silver, iridium, gold, platinum, cobalt and mixtures thereof, said substrate has an electrically conductive surface selected from the group consisting of stainless steel, brass, gold, silver, nickel, cadmium, platinum, iridium and mixtures thereof, and said metal coating is selected from the group consisting of gold, nickel, cadmium, platinum, iridium and mixtures thereof.

5. A radiation source of claim 2 comprising a gamma-radiation source having a gamma-emitter radioactive isotope.

6. A gamma-radiation source of claim 5 wherein said gamma-emitter and a bonding metal are selected from the group consisting of americium-241 gamma-emitter and silver, iridium, gold, platinum, cobalt and mixtures thereof bonding metal; and, plutonium-238 gamma-emitter and silver, iridium, gold, platinum, cobalt and mixtures thereof bonding metal; said substrate has an electrically conductive surface selected from the group consisting of stainless steel, brass, gold, silver, nickel, cadmium, platinum, iridium and mixtures thereof; and said protective metal coating is selected from the group consisting of gold, nickel, cadmium, platinum, iridium and mixtures thereof.

7. A radiation source of claim 2 comprising a neutron-radiation source having a neutron-emitter isotope.

8. A neutron radiation source of claim 7 wherein said neutron-emitter is californium-252, said bonding metal is selected from the group consisting of terbium, silver, gold and mixtures thereof, said substrate has an electrically conductive surface selected from the group consisting of stainless steel, brass, gold, silver, nickel, cadmium, platinum, iridium and mixtures thereof, and said protective metal coating is selected from the group consisting of gold, nickel, cadmium, platinum, iridium and mixtures thereof.

9. A radiation source of claim 2 comprising a beta-radiation source having a beta-emitter radioactive isotope.

10. A beta-radiation source of claim 9 wherein said beta-emitter is promethium-147 and said bonding metals are selected from the group consisting of cobalt, rhodium, iridium, nickel, platinum, gold and mixtures thereof; said substrate has an electrically conductive surface selected from the group consisting of stainless steel, brass, gold, silver, nickel, cadmium, platinum, iridium and mixtures thereof; and, said protective metal coating is selected from the group consisting of gold, nickel, cadmium, platinum, iridium and mixtures thereof.

11. An alpha-source of claim 3 comprising a substrate of brass coated with gold, an alpha-emitter of americium-241, a bonding metal of gold, and a protective coating of gold.

12. An alpha-source of claim 3 comprising a substrate of brass coated with gold, an alpha-emitter of curium-244, a bonding metal of gold, and a protective coating of nickel.

13. An alpha-source of claim 3 comprising a substrate of stainless steel coated with gold, an alpha-emitter of americium-241, a bonding metal of gold, and a protective coating of nickel.

14. An alpha-source of claim 3 comprising a substrate of brass coated with gold, an alpha-emitter of plutonium-238, a bonding metal of gold, and a protective coating of nickel.

15. An alpha-source of claim 3 comprising a substrate of nickel coated with gold, an alpha-emitter of americium-241, a bonding metal of gold, and a protective coating of gold.

16. An alpha-source of claim 15 comprising a protective coating of nickel over said protective coating of gold.

17. An alpha-source of claim 16 comprising a protective coating of gold over said protective coating of nickel.

18. An alpha-source of claim 3 comprising a substrate coated on both sides with alpha-emitter and bonding metal providing substantially equal alpha-radiation from both sides of said substrate.

19. An alpha-source of claim 3 comprising an alpha-emitter and bonding metal at more than one separated location on the same side of said substrate, each location providing substantially equal amounts of alpha-radiation.

20. An alpha-source of claim 19 comprising an alpha-emitter and bonding metal at two separated locations on the said substrate, each of said locations providing substantially equal amounts of alpha-radiation.

21. A process for providing radiation sources comprising codepositing a layer of a metal radioactive isotope of the scandium group with a non-radioactive bonding metal selected from Groups VB, VIB, VIIB, VIII, IB, IIB and IVB of the Periodic Table of Elements from an electrolytic solution in which said isotope is present in minor molar amount as compared to said bonding metal such that said layer contains a minor molar amount of said isotope compared to said bonding metal by electroplating on an electrically-conductive non-radioactive metal surface of a cathode substrate.

22. A process of claim 21 wherein a non-radioactive protective metal coating is deposited over said isotope and bonding metal on said surface, said coating being sufficiently thin to permit radiation to pass through said coating.

23. A process of claim 22 wherein said protective metal coating is deposited by electroplating.

24. A process of claim 22 wherein said radiation source comprises an alpha-radiation source having an alpha-emitter radioactive isotope.

25. A process of claim 24 wherein said alpha-emitter is selected from the group consisting of americium-241, curium-244 and plutonium-238, said bonding metal is selected from the group consisting of silver, iridium, gold, platinum, cobalt and mixtures thereof, said substrate has an electrically conductive surface selected from the group consisting of stainless steel, brass, gold, silver, nickel, cadmium, platinum, iridium and mixtures thereof, and said protective metal coating is selected from the group consisting of gold, nickel, cadmium, platinum, iridium and mixtures thereof.

26. A process of claim 22 wherein said radiation source comprises a gamma-radiation source having a gamma-emitter radioactive isotope.

27. A process of claim 26 wherein said gamma-emitter and bonding metal are selected from the group consisting of americium-241 gamma-emitter and silver, iridium, gold, platinum, cobalt, and mixtures thereof bonding metal; and, plutonium-238 gamma-emitter and silver, iridium, gold platinum, cobalt and mixtures thereof bonding metal; said substrate has an electrically conductive surface selected from the group consisting of stainless steel, brass, gold, silver, nickel, cadmium, platinum, iridium and mixtures thereof; and, said protective metal coating is selected from the group consisting of gold, nickel, cadmium, platinum, iridium and mixtures thereof.

28. A process of claim 22 wherein said radiation source comprises a neutron radiation source having a neutron-emitter radioactive isotope.

29. A process of claim 28 wherein said neutron-emitter is californium-252, said bonding metal is selected from the group consisting of terbium, silver, gold and mixtures thereof, said substrate has an electrically conductive surface selected from the group consisting of stainless steel, brass, gold, silver, nickel, cadmium, platinum, iridium and mixtures thereof, and said protective metal coating is selected from the group consisting of gold, nickel, cadmium, platinum, iridium and mixtures thereof.

30. A process of claim 22 wherein said radiation source comprises a beta-emitter radioactive isotope.

31. A process of claim 30 wherein said beta-emitter is promethium-147 and said bonding metals are selected from the group consisting of cobalt, rhodium, iridium, nickel, platinum, gold and mixtures thereof; said substrate has an electrically conducting surface selected from the group consisting of stainless steel, brass, gold, silver, nickel, cadmium, platinum, iridium and mixtures thereof; and, said protective metal coating is selected from the group consisting of gold, nickel, cadmium, platinum, iridium and mixtures thereof.

32. A process of claim 24 comprising a substrate of brass coated with gold, an alpha-emitter of americium- 241, a bonding metal of gold, and a protective coating of gold.

33. A process of claim 24 comprising a substrate of brass coated with gold, an alpha-emitter of curium-244, a bonding metal of gold, and a protective coating of nickel.

34. A process of claim 24 comprising a substrate of stainless steel coated with gold, an alpha-emitter of americium-241, a bonding metal of gold and a protective coating of nickel.

35. A process of claim 24 comprising a substrate of brass coated with gold, an alpha-emitter of plutonium-238, a bonding metal of gold, and a protective coating of nickel.

36. A process of claim 24 comprising a substrate of nickel coated with gold, an alpha-emitter of americium-241, a bonding metal of gold, and a protective coating of gold.

37. A process of claim 36 comprising a protective coating of nickel over said protective coating of gold.

38. A process of claim 37 comprising a protective coating of gold over said protective coating of nickel.

39. A process of claim 24 comprising a substrate coated on both sides with alpha-emitter and bonding metal providing substantially equal alpha-radiation from both sides of said substrate.

40. A process of claim 24 comprising alpha-emitter and bonding metal at more than one separated location on the same side of said substrate, each location providing substantially equal amounts of alpha-radiation.

41. A process of claim 40 comprising alpha-emitter and bonding metal at two separated locations on the said substrate, each of said locations providing substantially equal amounts of alpha-radiation.

* * * * *